United States Patent
Takata et al.

(10) Patent No.: US 9,879,885 B2
(45) Date of Patent: Jan. 30, 2018

(54) COOLING WATER SUPPLY SYSTEM AND BINARY CYCLE POWER PLANT INCLUDING SAME

(71) Applicant: MITSUBISHI HITACHI POWER SYSTEMS, LTD., Yokohama-shi, Kanagawa (JP)

(72) Inventors: Ryo Takata, Tokyo (JP); Tsuyoshi Suzuki, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 14/408,401

(22) PCT Filed: Jul. 30, 2013

(86) PCT No.: PCT/JP2013/070568
§ 371 (c)(1),
(2) Date: Dec. 16, 2014

(87) PCT Pub. No.: WO2014/034354
PCT Pub. Date: Mar. 6, 2014

(65) Prior Publication Data
US 2015/0168022 A1  Jun. 18, 2015

(30) Foreign Application Priority Data

Aug. 30, 2012 (JP) ................. 2012-190314

(51) Int. Cl.
*F24J 3/08* (2006.01)
*F01K 9/00* (2006.01)
*F03G 7/04* (2006.01)
*F01K 25/10* (2006.01)

(52) U.S. Cl.
CPC .............. *F24J 3/085* (2013.01); *F01K 9/003* (2013.01); *F01K 25/10* (2013.01); *F03G 7/04* (2013.01);
(Continued)

(58) Field of Classification Search
CPC .......... F24J 3/08; F24J 3/085; F24J 2003/087; F01K 9/003; F01K 25/10; F03G 7/04; Y02E 10/14
See application file for complete search history.

(56) References Cited

U.S. PATENT DOCUMENTS

| | | | | |
|---|---|---|---|---|
| 4,967,559 A | * | 11/1990 | Johnston | ................ B01D 53/52 210/747.1 |
| 2009/0126923 A1 | | 5/2009 | Montgomery et al. | |
| 2012/0260655 A1 | * | 10/2012 | Kaplan | ................... F01K 25/08 60/641.2 |

FOREIGN PATENT DOCUMENTS

| JP | 50-146737 A | 11/1975 |
|---|---|---|
| JP | 51-42844 A | 4/1976 |

(Continued)

OTHER PUBLICATIONS

International Search Report dated Aug. 27, 2013 issued in corresponding application No. PCT/JP2013/070568.
(Continued)

*Primary Examiner* — Audrey K Bradley
(74) *Attorney, Agent, or Firm* — Westerman, Hattori, Daniels & Adrian (57) ABSTRACT

A cooling water supply system includes a separator (3) that separates high-temperature/high-pressure geothermal water introduced from a production well (1) into steam and hot water; an evaporator (7) that evaporates a heat medium by performing heat exchange with the steam separated by the separator; a steam turbine (9) that is driven with steam of the heat medium evaporated by the evaporator (7); a power generator (9a) that is driven by the steam turbine (9) to generate power; a condenser (16) that condenses the heat medium introduced from the steam turbine (9) by performing heat exchange with cooling water; a cooling tower (20) that cools the cooling water to be supplied to the condenser (Continued)

(16); and a reservoir (11) that supplies the cooling water to the cooling tower, wherein the geothermal water introduced from the production well (1) is used as the cooling water.

15 Claims, 5 Drawing Sheets

(52) U.S. Cl.
    CPC .......... *F24J 2003/087* (2013.01); *Y02E 10/14* (2013.01)

(56) References Cited

FOREIGN PATENT DOCUMENTS

| JP | 60-67788 A | | 4/1985 |
|----|------------|---|--------|
| JP | 64-36985 A | | 2/1989 |
| JP | 3-111606 A | | 5/1991 |
| JP | 03111606 A | * | 5/1991 |
| JP | 5-272308 A | | 10/1993 |
| JP | 11-36818 A | | 2/1999 |
| JP | 2011-27060 A | | 2/2011 |

OTHER PUBLICATIONS

Written Opinion of the International Searching Authority dated Aug. 27, 2013 issued in corresponding application No. PCT/JP2013/070568.

Decision to Grant dated Sep. 6, 2016, issued in counterpart Japanese application No. 2012-190314 (3 pgs.).

Office Action dated May 31, 2016, issued in counterpart Japanese application No. 2012-190314, with English translation. (8 pages).

* cited by examiner

COOLING WATER SUPPLY SYSTEM AND BINARY CYCLE POWER PLANT INCLUDING SAME

TECHNICAL FIELD

The present invention relates to a cooling water supply system suitable for use in general geothermal power generation and a binary cycle power plant including the same.

BACKGROUND ART

Geothermal power generation facilities generally generate power by excavating the underground to a specific depth so as to make geothermal fluid, which includes steam and hot water that coexist under high pressure at a deep underground part, erupt to the ground, separating the geothermal fluid into steam and hot water with a separator, and rotationally driving a turbine with the separated steam.

There is also known binary cycle power generation which uses heat media (inflammable media) lower in boiling point than water, such as ammonia, pentane and chlorofluorocarbon, as working fluid, so that even when underground temperature and/or pressure are low and only hot water is available, power generation can be performed by boiling the heat media with the hot water and thereby driving a turbine.

These geothermal power generation facilities are generally installed in mountainous regions which lack a water source. Under these circumstances, it is difficult to adopt a water cooling-type device for cooling the facilities, and therefore air cooling-type cooling towers and the like are adopted. Unfortunately, the air cooling-type device is larger in power consumption and less efficient in cooling the facilities than the water cooling-type device.

One of the solutions to these problems is disclosed, for example, in PTL 1.

PTL 1 discloses an emergency cooling device in an organic medium-applied power recovery plant, the plan including: a primary pipe for circulating a heat source fluid; and a closed-loop secondary pipe for circulating a low-boiling point organic medium as a working medium, the secondary pipe being equipped with an evaporator that evaporates the working medium through heat exchange with the heat source fluid in the primary pipe, a turbine driven with generated medium steam, a condenser that condenses exhaust steam of the turbine, and a bypass pipe that bypasses the turbine and communicates with the condenser from the evaporator side, the bypass pipe being opened at the time of emergency shutdown of the plant. The emergency cooling device supplies a cooling fluid to a portion of the primary pipe that is upstream of the evaporator at the time of emergency shutdown of the plant.

It is stated that since the cooling fluid is supplied to a portion of the primary pipe that is upstream of the evaporator at the time of emergency shutdown of the plant, it becomes possible to prevent continuous generation of the working medium in the evaporator after emergency shutdown and to thereby lower the temperature of the heat source fluid inside the evaporator to the level where pyrolysis of the working medium is negligible. It is stated that in this case, a heat source fluid that is reserved and cooled or a heat-exchanged heat source fluid returning from the downstream of the evaporator is used as the cooling fluid of the emergency cooling device, so that the heat source fluid can easily be secured.

CITATION LIST

Patent Literature

{PTL 1}
Japanese Unexamined Patent Application, Publication No. Hei5-272308

SUMMARY OF INVENTION

Technical Problem

In the emergency cooling device disclosed in PTL 1, the reserved and cooled heat source fluid or the heat-exchanged heat source fluid returning from the downstream of the evaporator is used as the cooling water. However, there is a problem that the cooling water contains a large quantity of impurities, so that facilities are corroded thereby.

Moreover, when the air cooling-type cooling towers are used in a region having difficulty in securing a water source (such as a mountainous region), a problem of increased power consumption arises.

Furthermore, when the water cooling-type cooling towers are used, the cooling water heated by the heat exchanger evaporates, which causes a problem of a decreased cooling water flow.

The present invention has been made in view of such circumstances, and an object of the present invention is to provide a cooling water supply system capable of stably supplying cooling water to a water cooling-type cooling device even in a region that lacks a water source, and a binary cycle power plant including the same.

Solution to Problem

A binary cycle power plant of the present invention includes: a separator that separates high-temperature/high-pressure geothermal water introduced from a production well into steam and hot water; an evaporator that evaporates a heat medium by performing heat exchange with the steam separated by the separator; a vapor turbine that is driven with vapor of the heat medium evaporated by the evaporator; a power generator that is driven by the vapor turbine to generate power; a condenser that condenses the heat medium introduced from the vapor turbine by performing heat exchange with cooling water; a cooling tower that cools the cooling water to be supplied to the condenser; and a reservoir that supplies the cooling water to the cooling tower, wherein the geothermal water introduced from the production well is used as the cooling water.

The high-temperature/high-pressure geothermal water introduced from the production well is separated into steam and hot water by the separator. The steam separated by the separator is made to pass through the evaporator and is sent to the reservoir. The steam naturally cooled by the reservoir (for example, a tank) turns into liquid (geothermal water), and is used as cooling water for the cooling tower. Therefore, in geothermal power plants installed in a region that lacks a water source (for example, a mountainous region), a water cooling-type cooling tower can be used. Since the water cooling-type cooling tower does not require a large number of cooling fans as in the air cooling-type cooling tower, consumption of power to drive the fans can be reduced. Or using the water-cooling type makes it possible to employ a natural cooling-type cooling tower which does not use a cooling fan. In that case, cooling can be performed without consuming electric power. Furthermore, the geothermal water can be used as a supply of the cooling water evaporated in the cooling tower. As a result, even in the geothermal power plants installed in a region that lacks a water source, the water cooling-type cooling fans can be placed, so that the cooling efficiency of the facilities can be enhanced.

Furthermore, in the binary cycle power plant of the present invention, the steam separated by the separator may be used as the cooling water.

The steam, hot water, or drain separated by the separator can be used as the cooling water which is evaporated and thereby decreased in the cooling tower. As a consequence, the water cooling-type cooling tower can be used in the geothermal power plants that lack a water source. Since the number of necessary cooling fans is smaller than that in the air-cooling type, power consumption can be reduced. Moreover, since the water cooling-type cooling tower can be used, the enthalpy at an exit of the turbine can be lowered as compared with the case of the air cooling-type cooling tower. Therefore, output power of the turbine can be increased.

Furthermore, the binary cycle power plant of the present invention may include a preheater that uses the hot water introduced from the evaporator to preheat the heat medium introduced from the condenser.

The steam separated from the separator imparts heat to a heat medium in the evaporator and then flows to the preheater where the steam imparts heat to the heat medium. The efficiency of the facility can be enhanced by imparting the heat of the steam to the heat medium. Since the steam efficiently imparts heat to the heat medium, it becomes possible to enhance cooling efficiency in natural cooling of steam, hot water, or drain in the reservoir and in cooling by the cooling tower.

Furthermore, in the binary cycle power plant of the present invention, the steam introduced from the evaporator may be used as the cooling water, and a supply line that introduces the steam to the reservoir may be equipped with a pressure-reducing valve.

The steam separated by the separator is supplied to the evaporator and heats a low-boiling point medium, before being returned to the hot water pipe. A part of the steam returning to the hot water pipe is branched and sent to the reservoir that reserves steam drain, without passing through a preheater. When the steam is not made to pass through a second preheater, the steam is in a high-temperature/high-pressure state though the steam has gone through heat exchange with the low-boiling point medium in the evaporator. Accordingly, the supply line that introduces steam, hot water, or drain to the reservoir is equipped with a pressure-reducing valve to perform pressure reduction. As a consequence, the steam, hot water, or drain can be used without passing through the second preheater. Since it is not necessary to provide the second preheater, cost reduction can be achieved. The reservoir may preferably be constituted of an independently provided cooling tower.

Furthermore, in the binary cycle power plant of the present invention, return hot water branched from the hot water pipe that returns hot water to a return well may be used as the cooling water.

The steam separated by the separator is supplied to the evaporator, and heats the heat medium before being returned to the hot water pipe. A part of the hot water returning to the return well is branched and sent to the reservoir that reserves the steam (drain). The reservoir can be downsized as compared with the case where the whole quantity of steam (drain) is used as the cooling water. As a result, the facilities can be made compact.

Furthermore, in the binary cycle power plant of the present invention, the hot water pipe may be equipped with a flasher that separates the return hot water into steam and liquid, and the steam separated by the flasher may be used as the cooling water.

The flasher allows the hot water to expand under a reduced pressure and thereby generates steam, so that impurities in the hot water can be filtered. The steam is supplied to the reservoir. As a result, purified steam can be sent to the reservoir.

Furthermore, in the binary cycle power plant of the present invention, the reservoir may be placed at a position higher than the cooling tower.

The reservoir (for example, a tank) is placed (constructed) at a position higher than a turbine-side cooling tower. As a consequence, cooling water is supplied to the cooling tower by using potential energy, so that conveyance power such as pumps can be omitted or reduced as much as possible. Moreover, since the pressure of hot water can be used for the reservoir, the hot water can be supplied to the reservoir with reduced power consumption. This makes it possible to enhance the performance of the entire plant.

The cooling water supply system of the present invention may further include: a facility having a heat medium that receives a supply of cooling water; and a cooling tower that cools the cooling water to be supplied to the facility, and steam may be used as the cooling water.

As the cooling water to cool the heat medium of the facility, we decided to use steam, hot water, or drain. Accordingly, facilities which do not have a water source in their surroundings can also employ the water cooling-type cooling tower which consumes a large amount of water. Therefore, the facilities can be cooled efficiently.

The cooling water supply system of the present invention may further include a hot water pipe that returns steam generated by and discharged from the evaporator to a return well, and the steam branched from the hot water pipe that returns steam to the return well may be used as the cooling water.

The steam separated by the separator is made to pass through the evaporator and is returned to the hot water pipe where the steam joins with hot water. The hot water that joined with the steam is returned to the return well. A part of the hot water in the hot water pipe that is returned to the return well is extracted, and is sent to the reservoir so as to be used as the cooling water to be supplied to the cooling tower.

In the case where the hot water contains impurities (for example, silica and the like), it is preferable to adjust pH of the hot water with chemicals before using the hot water as the cooling water.

Since a part of the hot water is extracted and used as the cooling water, the configuration of the facility can be further simplified.

Advantageous Effects of Invention

According to the present invention, the following operational effects are accomplished.

Even in the geothermal power plants installed in a region that lacks a water source (for example, a mountainous region), a water cooling-type cooling tower can be provided. Since a large number of cooling fans as in the air cooling-type cooling tower are not needed, consumption of power to drive the cooling fans can be reduced. Moreover, the steam separated by the separator can be used as cooling water evaporated in the cooling tower. As a result, even in the geothermal power plants installed in the region that lacks a water source, the water cooling-type cooling tower can be installed, so that the cooling efficiency of the facilities can be enhanced.

DESCRIPTION OF EMBODIMENTS

Hereinbelow, the embodiments of the cooling water supply system and the binary cycle power plant including the same according to the present invention will be described with reference to the drawings.

First Embodiment

Figure 1:
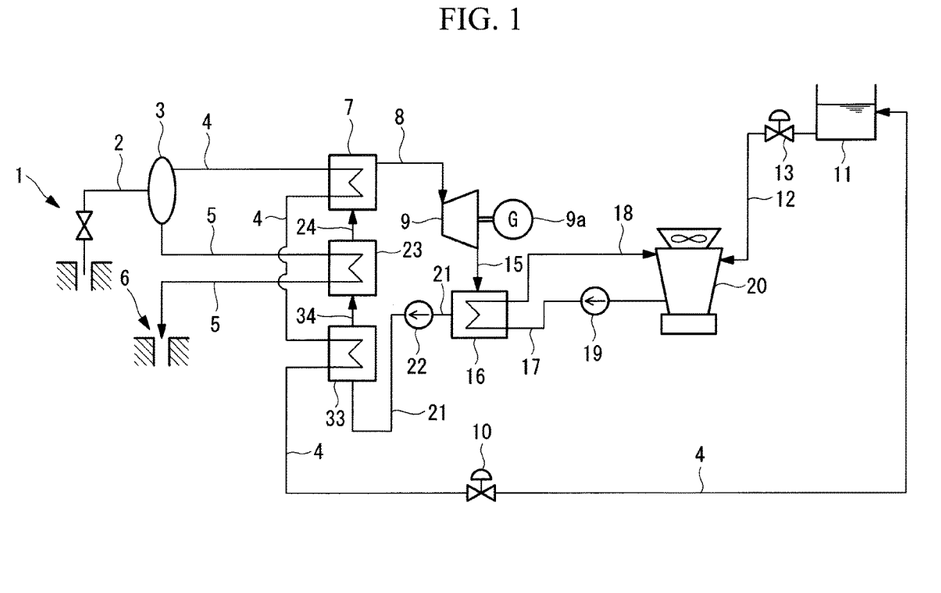
FIG. 1 is a schematic configuration view illustrating a first embodiment of a cooling water supply system and a binary cycle power plant including the same of the present invention.

FIG. 1 illustrates the schematic configuration of a cooling water supply system and a binary cycle power plant including the same according to a first embodiment of the present invention. The present embodiment relates to a binary cycle power plant that uses geothermal energy to heat working fluid (for example, hydrocarbon combustible materials) and uses steam of the working fluid to rotationally drive a turbine so as to generate power.

As illustrated in FIG. 1, the cooling water supply system and the binary cycle power plant including the same include a separator 3, an evaporator 7, a vapor turbine 9, a power generator 9a, a condenser 16, a cooling tower 20, and a reservoir 11.

The separator 3 is provided to separate high-temperature/high-pressure geothermal water, which is introduced from a production well 1, into steam and hot water. An upper part of the separator 3 is connected to a high-temperature steam pipe 4, while a lower part of the separator 3 is connected to a high-temperature hot water pipe 5.

The evaporator 7 is provided to evaporate working fluid (heat medium) by performing heat exchange with the steam separated by the separator 3. The vapor turbine 9 is provided to be driven with the steam of the working fluid evaporated in the evaporator 7, and the power generator 9a is provided to be driven by the vapor turbine 9 to generate power.

The vapor of the working fluid that drove the vapor turbine 9 is introduced to the condenser 16 via a turbine exhaust pipe 15. The condenser 16 condenses the fluid introduced from the vapor turbine 9 by performing heat exchange with cooling water. The cooling tower 20 is provided to cool the cooling water to be supplied to the condenser 16. The cooling water is supplied to the cooling tower 20 from the reservoir 11.

The reservoir 11 is connected to a cooling water supply pipe 12 and a high-temperature steam pipe 4. The reservoir 11 is placed (constructed) at a position higher than the cooling tower 20 on the vapor turbine 9 side. Steam, hot water, or drain reserved in the reservoir 11 is cooled by natural cooling and is supplied to the cooling tower 20 by opening and closing of a cooling water supply valve 13 provided on the cooling water supply pipe 12. The flow rate of the steam supplied to the reservoir 11 is adjusted with a valve 10. The reservoir 11 may preferably be constituted of an independently provided cooling tower 20a (see FIG. 2).

A description is now given of the operation of the above-configured cooling water supply system and the binary cycle power plant including the same.

A geothermal source (for example, steam and/or hot water) erupted from the production well 1 is supplied to the separator 3 via a geothermal source pipe 2. The separator 3 is equipped with the high-temperature steam pipe 4 and the high-temperature hot water pipe 5. The geothermal source is separated into high-temperature steam and high-temperature hot water by the separator 3. The separated high-temperature steam, which flows through the high-temperature steam pipe 4, is used to heat the working fluid inside the evaporator 7. After heating the working fluid inside the evaporator 7, the steam is further made to pass through a heat exchanger 33 (second preheater) to heat the working fluid. The steam that exited from the heat exchanger 33 is supplied to the reservoir 11 (for example, a tank) via the high-temperature steam pipe 4.

Meanwhile, the high-temperature hot water separated by the separator 3 flows through the high-temperature hot water pipe 5 and passes through a heat exchanger 23 (a first preheater) that uses heat of the high-temperature hot water as a heating source of the working fluid. The hot water that imparted heat to the working fluid in the heat exchanger 23 is returned to a return well 6 through the high-temperature hot water pipe 5.

The working fluid, which is turned into steam in the evaporator 7, is guided to the vapor turbine 9 via a high-temperature working fluid pipe 8, where the steam does a work of rotating a shaft to drive a power generator (not illustrated).

The vapor which finished the work and exited from the vapor turbine 9 is cooled and condensed in the condenser 16. The condensed working fluid is pumped to the heat exchanger 33 and the heat exchanger 23 (preheater) by a pump 22 through a low-temperature working fluid pipe 21, and is then returned to the evaporator 7 via a working fluid pipe 24. The condenser 16 is also connected to a cooling water supply pipe 17, through which cooling water is supplied by a pump 19. The cooling water which cooled the condenser 16 is supplied to the cooling tower 20 via a cooling water return pipe 18, so that the cooling water is cooled.

According to the present embodiment, the following operational effects are accomplished.

The steam separated by the separator 3 is made to pass through the evaporator 7 and sent to the reservoir 11. The steam naturally cooled by the reservoir 11 (for example, a tank) turns into liquid (steam drain) to be used as the cooling water of the cooling tower 20. Therefore, in the geothermal power plants installed in a region that lacks a water source (for example, a mountainous region), the water cooling-type cooling tower 20 can be used.

Since a large number of cooling fans as in the air cooling-type cooling tower are not needed, consumption of power to drive the cooling fans can be reduced.

Moreover, since the water cooling-type cooling tower 20 can be used, the enthalpy at an exit of the vapor turbine 9 can be lowered as compared with the case of the air cooling-type cooling tower. Therefore, output power of the vapor turbine 9 can be increased.

Furthermore, the steam (geothermal water) can be used as a supply of the cooling water evaporated in the cooling tower 20. As a result, even in the geothermal power plants installed in the region that lacks a water source, the water cooling-type cooling fans can be placed, so that the cooling efficiency of the facilities can be enhanced.

Modification of First Embodiment

Next, a modification of the first embodiment of the present invention will be described with reference to FIG. 2.

In this modification, the high-temperature steam pipe 4 illustrated in the first embodiment is branched to supply steam to the reservoir 11. Therefore, component members identical to those in the first embodiment are designated with identical reference signs to omit the description thereof.

Figure 2:
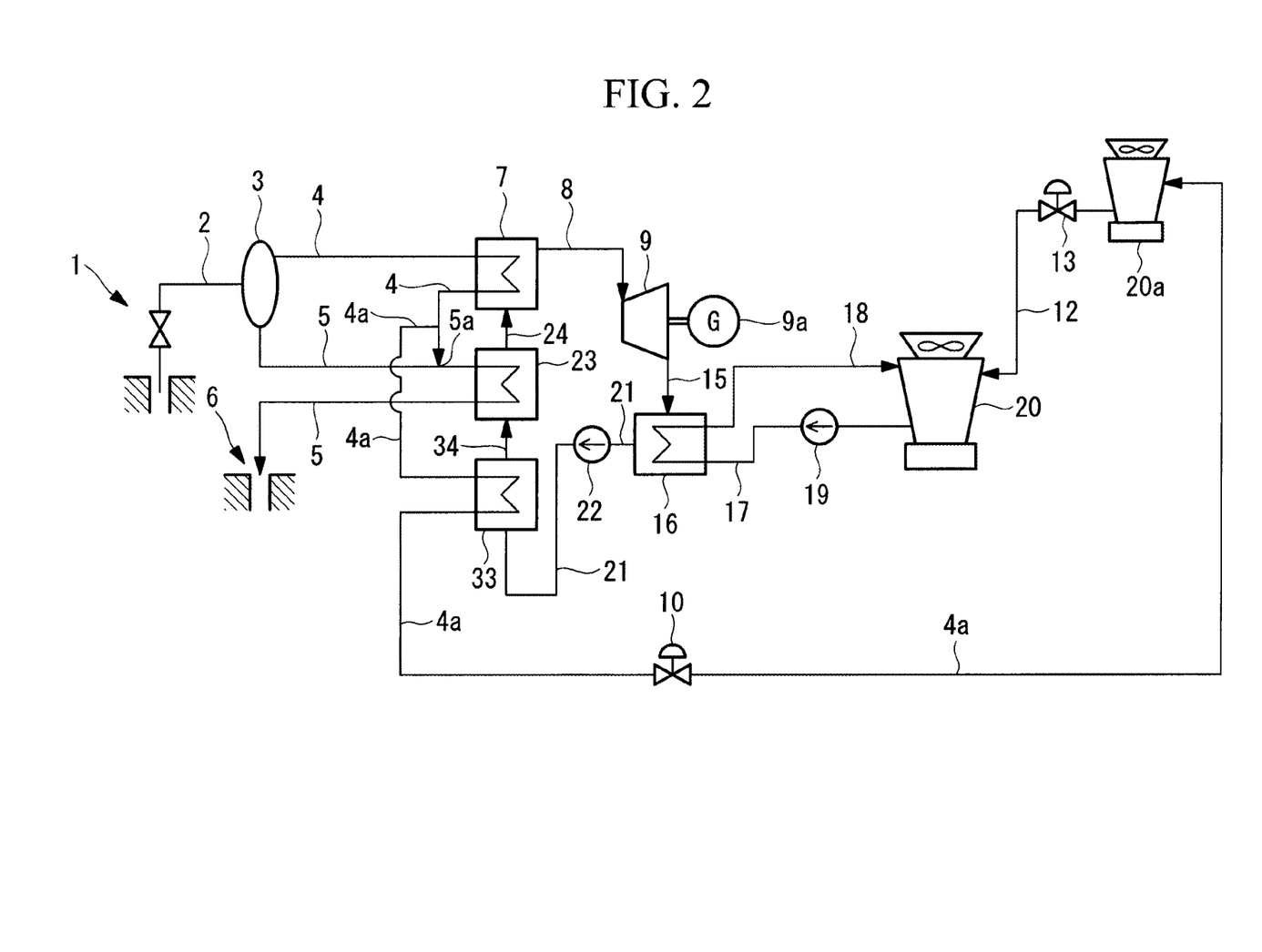
FIG. 2 is a schematic configuration view illustrating a modification of the first embodiment of the cooling water supply system and the binary cycle power plant including the same of the present invention.

As illustrated in FIG. 2, the high-temperature steam pipe 4 is connected to the evaporator 7, and the other end of the high-temperature steam pipe 4 joins with the high-temperature hot water pipe 5 at a joining portion 5a. A high-pressure steam pipe 4a is branched from the high-temperature steam pipe 4 on the upstream side of the joining portion 5a.

The steam separated by the separator 3 is supplied to the evaporator 7 and heats the working fluid before being returned to the high-temperature hot water pipe 5. A part of the steam returned to the high-temperature hot water pipe 5 is branched and sent to the reservoir 11 that reserves the steam (drain) via a high-pressure steam pipe 4a. The reservoir 11 can be downsized as compared with the case where the whole quantity of steam (drain) is used as the cooling water. As a result, the facilities can be made compact.

Second Embodiment

Next, a second embodiment of the present invention will be described with reference to FIG. 3.

In this embodiment, a high-pressure steam pipe 4a is branched from the high-temperature steam pipe 4 illustrated in the modification of the first embodiment so as to supply steam to the reservoir 11 without passing through the heat exchanger. Therefore, component members identical to those in the modification of the first embodiment are designated with identical reference signs to omit the description thereof.

Figure 3:
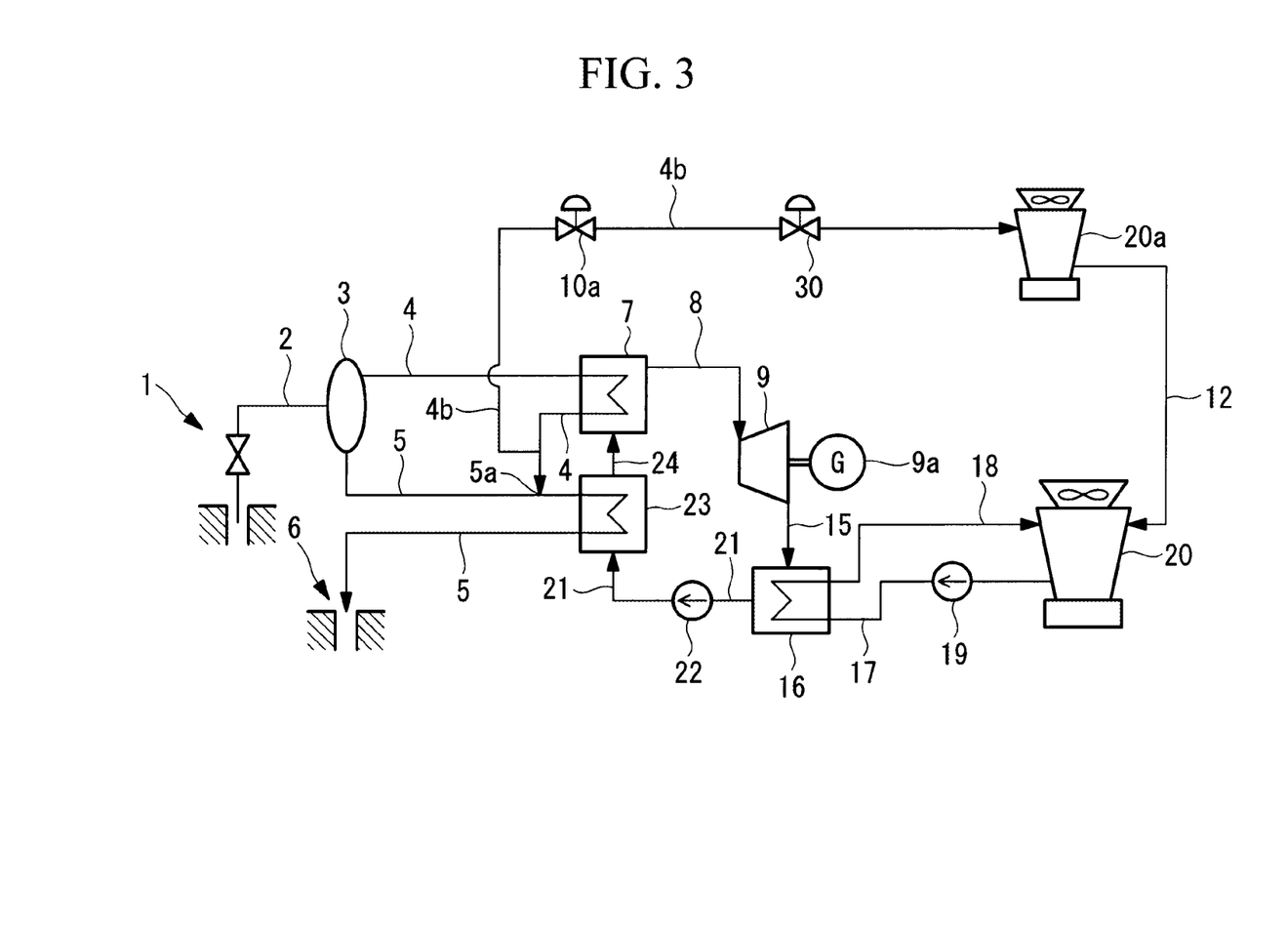
FIG. 3 is a schematic configuration view illustrating a second embodiment of the cooling water supply system and the binary cycle power plant including the same of the present invention.

As illustrated in FIG. 3, the steam introduced from the evaporator 7 is used as the cooling water, and a supply line 4b that introduces the steam to the reservoir 11 is equipped with a flow regulating valve 10a and a pressure-reducing valve 30.

The steam separated by the separator 3 is supplied to the evaporator 7 and heats the working fluid before being returned to the high-temperature hot water pipe 5. A part of the steam returned to the high-temperature hot water pipe 5 is branched and sent to the reservoir 11 that reserves steam, hot water, or drain via the supply line 4b without passing through the heat exchanger (preheater).

According to the present embodiment, the branched steam does not pass through the heat exchanger. As a consequence, the steam is in a high-temperature/high-pressure state though the steam exchanges heat with the working fluid in the evaporator 7. Accordingly, the supply line 4b that introduces steam, hot water, or drain to the reservoir 11 is equipped with the pressure-reducing valve 30 to reduce pressure. As a consequence, the steam, hot water, or drain can be used without passing through the heat exchanger. Since it is not necessary to provide the heat exchanger, cost reduction can be achieved. The reservoir 11 may preferably be constituted of an independently provided cooling tower 20a.

Third Embodiment

Next, a third embodiment of the present invention will be described with reference to FIG. 4.

In the present embodiment, the high-pressure steam pipe 4a illustrated in the modification of the first embodiment is not provided, and hot water extracted from the high-temperature hot water pipe 5 is supplied to the reservoir 11. Therefore, component members identical to those in the modification of the first embodiment are designated with identical reference signs to omit the description thereof.

Figure 4:
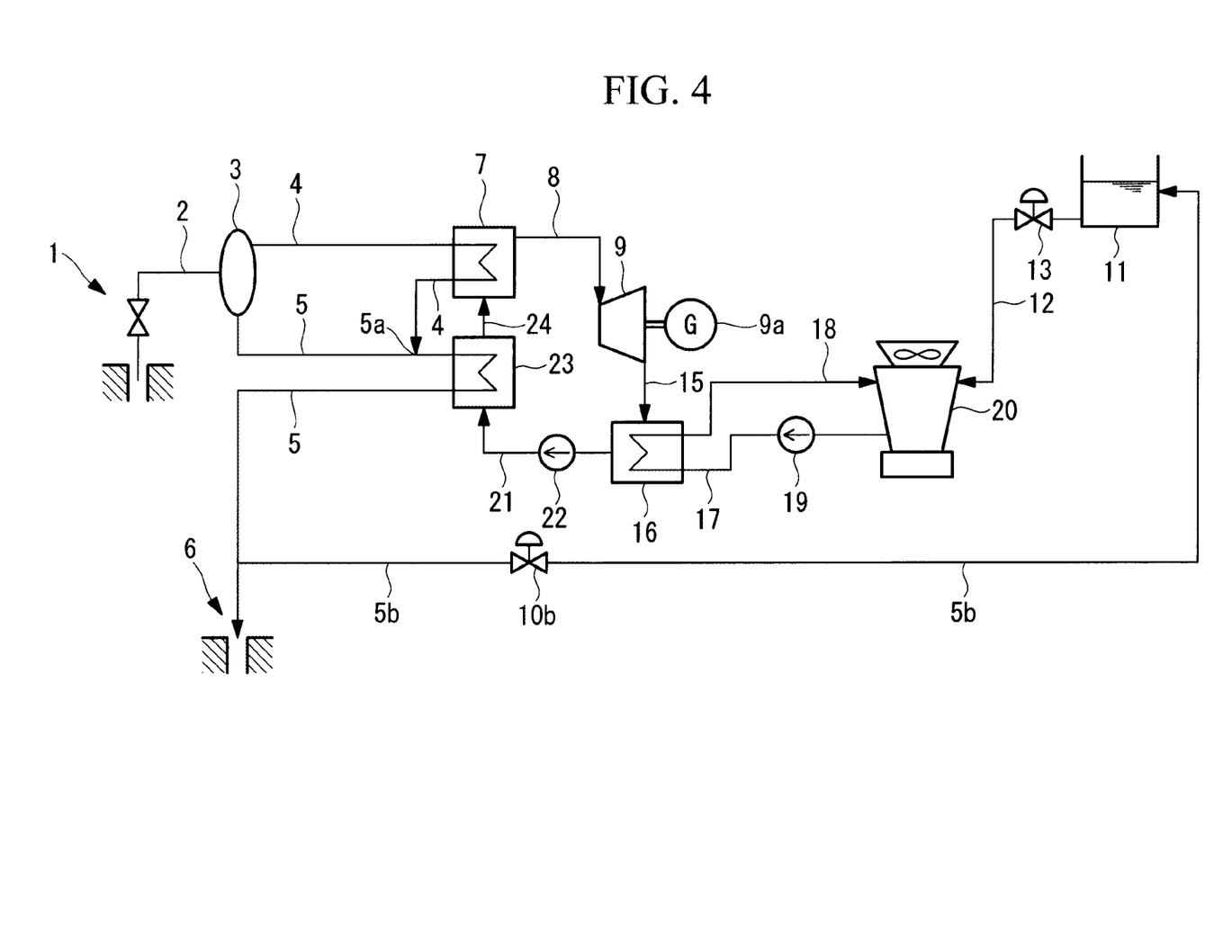
FIG. 4 is a schematic configuration view illustrating a third embodiment of the cooling water supply system and the binary cycle power plant including the same of the present invention.

As illustrated in FIG. 4, there is provided a high-temperature hot water pipe 5b branched from the high-temperature hot water pipe 5 that returns the steam, which is generated by and discharged from the evaporator 7, to the return well 6. There is also provided a control valve 10b that adjusts the flow rate of the hot water.

The steam separated by the separator 3 is made to pass the evaporator 7 before being returned to the high-temperature hot water pipe 5 and joining therein. The hot water that is joined with the steam is returned to the return well 6. A part of the hot water in the high-temperature hot water pipe 5 that is returned to the return well is extracted, and is sent to the reservoir 11 via the high-temperature hot water pipe 5b so as to be used as the cooling water to be supplied to the cooling tower 20.

Since a part of the hot water is extracted and used as the cooling water, the configuration of the facility can be further simplified. In the case where the hot water contains impurities (for example, silica and the like), it is preferable to adjust pH of the hot water with chemicals before using the hot water as the cooling water.

Fourth Embodiment

Next, a fourth embodiment of the present invention will be described with reference to FIG. 5.

In the present embodiment, the high-temperature hot water pipe 5 that returns hot water to the return well 6 illustrated in the third embodiment is equipped with a flasher 50. Therefore, component members identical to those in the third embodiment are designated with identical reference signs to omit the description thereof.

Figure 5:
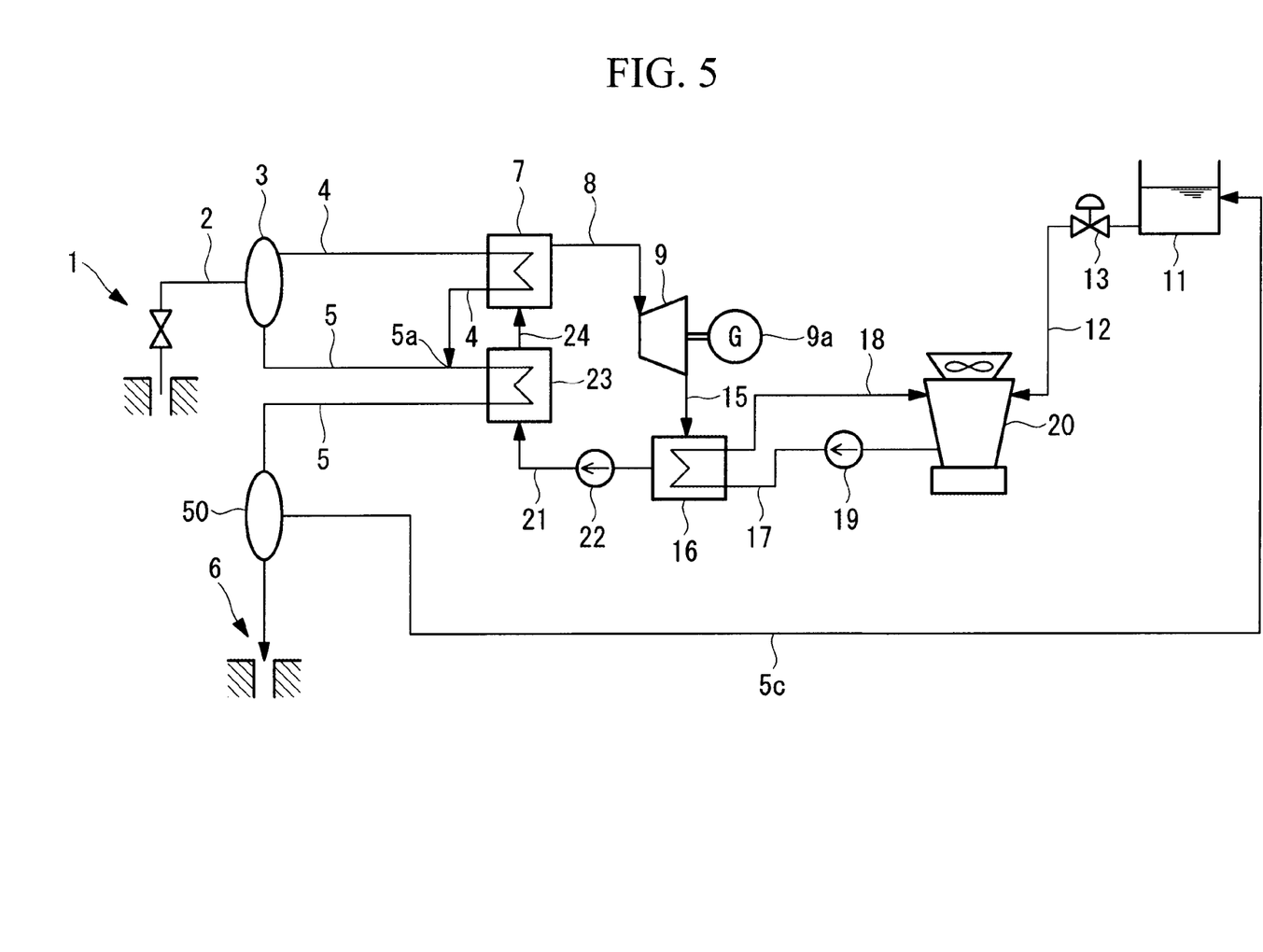
FIG. 5 is a schematic configuration view illustrating a fourth embodiment of the cooling water supply system and the binary cycle power plant including the same of the present invention.

As illustrated in FIG. 5, the high-temperature hot water pipe 5 that separates the return hot water into steam and hot water is equipped with the flasher 50.

The steam separated by the flasher 50 is supplied to the reservoir 11 via a cooling water supply pipe 5c. Meanwhile, the hot water separated by the flasher 50 is returned to the return well 6. Thus, the steam separated by the flasher 50 is used as the cooling water to be supplied to the cooling tower 20.

The flasher 50 allows the hot water to expand under a reduced pressure and thereby to generate steam, so that impurities in the hot water can be filtered. The steam is supplied to the reservoir 11. As a result, purified steam can be sent to the reservoir 11.

REFERENCE SIGNS LIST

1 Production well
2 Geothermal source pipe
3 Separator
4 High-temperature steam pipe
5 High-temperature hot water pipe
5a Joining portion
6 Return well
7 Evaporator
8 High-temperature working fluid pipe
9 vapor turbine
9a Power generator
11 Reservoir
15 Turbine exhaust pipe
16 Condenser
17 Cooling water supply pipe
18 Cooling water return pipe
19 Cooling water pump
20 Cooling tower
20a Cooling tower
21 Low-temperature working fluid pipe
22 Low-temperature working fluid transfer pump
23 Preheater
33 Second preheater
50 Flasher

The invention claimed is:

1. A binary cycle power plant, comprising:
a separator that separates high-temperature and high-pressure geothermal water introduced from a production well into steam and hot water;
an evaporator that evaporates a heat medium by performing heat exchange with the steam separated by the separator;
a vapor turbine that is driven with vapor of the heat medium evaporated by the evaporator;
a power generator that is driven by the vapor turbine to generate power;
a condenser that condenses the heat medium introduced from the vapor turbine by performing heat exchange with cooling water;
a reservoir which reserves water obtained by cooling and liquefying the steam having been heat-exchanged through the evaporator;
a preheater which is supplied with the hot water separated by the separator and which heats the heat medium, and
a cooling tower which is arranged in a downstream side of the reservoir, which cools the water supplied from the reservoir, and which supplies the water as the cooling water to the condenser,
wherein the geothermal water introduced from the production well is used as the cooling water,
wherein the steam separated by the separator is supplied to the evaporator and is branched into streams,
wherein one stream of branched steam is joined with the hot water which is introduced to the preheater, and
wherein the other stream of branched steam is introduced to the reservoir.

2. The binary cycle power plant according to claim 1, wherein the steam separated by the separator is used as the cooling water.

3. The binary cycle power plant according to claim 1, wherein
steam introduced from the evaporator is used as the cooling water,
further comprising a supply line that introduces the steam to the reservoir being equipped with a pressure-reducing valve.

4. The binary cycle power plant according to claim 1, wherein
the reservoir is placed at a position higher than the cooling tower.

5. The binary cycle power plant according to claim 1, wherein
return hot water branched from a hot water pipe that returns hot water to a return well is used as the cooling water.

6. The binary cycle power plant according to claim 5, wherein
the hot water pipe is equipped with a flasher that separates the return hot water into steam and liquid, and
the steam separated by the flasher is used as the cooling water.

7. A cooling water supply system, comprising:
a separator that separates high-temperature and high-pressure geothermal water introduced from a production well into steam and hot water;
an evaporator that evaporates a heat medium by performing heat exchange with the steam separated by the separator;
a hot water pipe that joins at least one part of steam discharged from the evaporator to the hot water separated by the separator and returns the joined steam and hot water to a return well; and
a facility that receives a supply of the cooling water and that condenses the heat medium by performing heat exchange with cooling water;
a reservoir that reserves water obtained by cooling and liquefying the steam having been heat-exchanged through the evaporator and supplies the cooling water to a cooling tower;
a preheater which is supplied with the hot water separated by the separator and which heats the heat medium; and
the cooling tower which is arranged in a downstream side of the reservoir, which cools the water supplied from the reservoir, and which supplies the water as the cooling water to the facility,
wherein steam of geothermal water is used as the cooling water, the steam of geothermal water being different from the heat medium and being introduced from the production well and having been heat-exchanged through the evaporator and being discharged from the evaporator,
wherein the steam obtained from the geothermal water being introduced from the production well is supplied to the evaporator and is branched into streams,
wherein one stream of branched steam is joined with stream of the hot water which is separated by the separator and is introduced to the return well through the preheater, and
wherein the other stream of branched steam is introduced to the reservoir.

8. The cooling water supply system according to claim 7 wherein
the steam obtained from the geothermal water, which is branched from the hot water pipe that returns the steam to the return well and having been heat-exchanged through the evaporator, is used as the cooling water.

9. A binary cycle power plant, comprising:
a separator that separates geothermal water comprising steam and hot water, the geothermal water being introduced from a production well;
an evaporator that performs thermal contact between the steam separated by the separator and a working fluid;
a vapor turbine driven with a vapor of the working fluid;
a condenser that performs thermal contact between the working fluid and a cooling water;
a reservoir that supplies water obtained by liquefying the steam from the evaporator as the cooling water to a cooling tower;
a first preheater which is supplied with the hot water separated by the separator and which heats the working fluid;
a second preheater that performs thermal contact between the steam introduced from the evaporator and the working fluid introduced from the condenser; and
the cooling tower which is provided between the reservoir and the condenser and which cools the cooling water to be supplied to the condenser,
wherein the evaporator and the first preheater are connected through a first pipe,
wherein the first preheater and the second preheater are connected through a second pipe,
wherein the first preheater further heats the working fluid having been heated in the second preheater and introduced from the second preheater via the second pipe, and
wherein the working fluid having been used in the thermal contact in the condenser flows through the second preheater and the first preheater in this order, and is then returned to the evaporator via the first pipe.

10. The binary cycle power plant according to claim 9, wherein the steam separated by the separator is used as the cooling water.

11. The binary cycle power plant according to claim 9, wherein
steam introduced from the evaporator is used as the cooling water,
further comprising a supply line that introduces the steam to the reservoir being equipped with a pressure-reducing valve.

12. The binary cycle power plant according to claim 9, wherein
the reservoir is placed at a position higher than the cooling tower.

13. The binary cycle power plant according to claim 9, wherein
steam that exited from the second preheater is supplied to the reservoir.

14. The binary cycle power plant according to claim 9, wherein
return hot water branched from a hot water pipe that returns hot water to a return well is used as the cooling water.

15. The binary cycle power plant according to claim 14, wherein
the hot water pipe is equipped with a flasher that separates the return hot water into steam and liquid, and
the steam separated by the flasher is used as the cooling water.

* * * * *